US005590685A

United States Patent [19]

Johnson

[11] Patent Number: 5,590,685

[45] Date of Patent: Jan. 7, 1997

[54] HIGH-LOW INDICATOR

[75] Inventor: Clarence W. Johnson, Calgary, Canada

[73] Assignee: Barber Industries, Ltd., Calgary, Canada

[21] Appl. No.: 298,346

[22] Filed: Aug. 29, 1994

Related U.S. Application Data

[63] Continuation-in-part of Ser. No. 14,554, Feb. 8, 1993, Pat. No. 5,341,837.

[51] Int. Cl.$^{6}$ .................... F16K 17/00

[52] U.S. Cl. .................... 137/552; 137/458; 137/492.5; 137/557

[58] Field of Search .................... 137/458, 556, 137/556.3, 557, 552, 492, 492.5

[56] References Cited

U.S. PATENT DOCUMENTS

| | | | |
|---|---|---|---|
| 907,103 | 12/1908 | Bowman | 137/458 |
| 3,042,057 | 7/1962 | Zorgdrager et al. | 137/458 X |
| 3,878,863 | 4/1975 | Snyder | 137/458 X |
| 4,091,832 | 5/1978 | Snyder et al. | 137/72 |
| 4,116,215 | 9/1978 | Muchow | 137/458 X |
| 4,523,602 | 6/1985 | Snyder | 137/458 X |
| 4,559,970 | 12/1985 | Taylor et al. | 137/557 |
| 5,213,133 | 5/1993 | Ellett | 137/458 |
| 5,341,837 | 8/1994 | Johnson | 137/458 |

OTHER PUBLICATIONS

Trade Publication: Otis Surface Safety Equipment & Services; 1980; p. 43.

Trade Publication: Otis Surface Safety Equipment and Systems; Date Unknown; pp. 38, 39.

Product Bulletin: Baker CAC High or Low Pressure Pilot Model HL–2; 1987; p. 5.

*Primary Examiner*—Stephen M. Hepperle

*Attorney, Agent, or Firm*—John Russell Uren

[57] ABSTRACT

An indicator for a pilot, particularly a two-line pilot to visually indicate whether a pilot has responded to a pressure condition within a flowline which pressure condition is outside a predetermined range. The visual indication also indicates whether the pressure condition is above or below the predetermined range.

4 Claims, 6 Drawing Sheets

FIG. I

HIGH-LOW INDICATOR

CROSS REFERENCE TO RELATED APPLICATION

This application is a continuation-in-part of U.S. application Ser. No. 08/014,554 filed Feb. 8, 1993, U.S. Pat. No. 5,341,837.

INTRODUCTION

This invention relates to a pilot valve and, more particularly, to a two line pilot valve which functions to allow the exit of hydraulic fluid within a control circuit when the pressure within a flowline being sensed by the pilot is outside desired operating limits.

BACKGROUND OF THE INVENTION

Pressure responsive pilot control valves act to provide a signal when a high or low pressure condition is sensed within the flowline or process to which such pilot valves are operably connected. A high pressure condition may be created, for example, by a line blockage. In such an event, if uncorrected, the well head pressure may exceed the line rating which can result in a line rupture. A low pressure condition may be created when there exists leakage. In either case, it is imperative that the flow within the flowline be terminated to prevent costly and potentially hazardous spills and to also prevent damage to equipment.

Conventionally, three line pilot valves have been used to sense pressure changes which are outside of desired operating ranges. Such pressure changes create a change in the operating configuration of the three line pilot such that a signal is forwarded and a shut-in valve is operated to close the flowline and terminate flow. Such a three way pilot valve is disclosed, for example, in our copending U.S. application Ser. No. 772,221 filed Oct. 4, 1991 (Ellett).

Inherently, however, three line pilots are more complex and have parts which are otherwise unnecessary in a two line pilot. However, it is important in two line pilots that the set points for fluid exit remain consistent over time and, so far as possible, are independent of the fluid pressure in the inlet chamber of the valve. The set points should change only when a spring is adjusted to deliberately change the set points.

SUMMARY OF THE INVENTION

According to the invention, there is provided an indicator to visually indicate whether a pilot valve has responded to a pressure condition above or below a predetermined pressure range within a circuit, said visual indication for said pressure condition above said predetermined range being different from said visual indication for said pressure condition below said predetermined range.

BRIEF DESCRIPTION OF THE SEVERAL VIEWS OF THE DRAWINGS

Specific embodiments of the invention will now be described, by way of example only, with the use of drawings in which.

DESCRIPTION OF SPECIFIC EMBODIMENT

Figure 1:
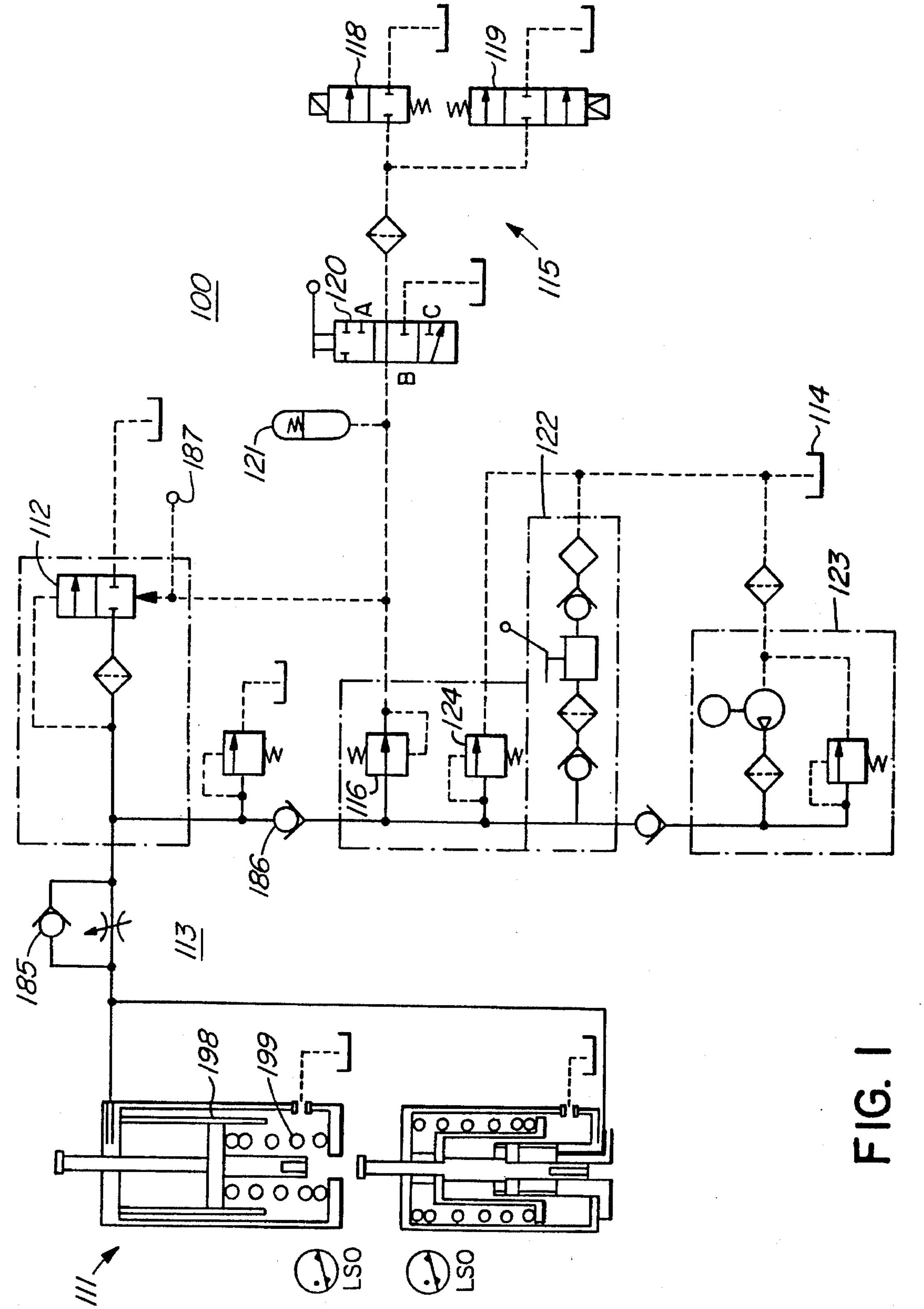
FIG. 1 is a diagrammatic hydraulic schematic illustrating the pilot valve in operating relationship with the actuator and control circuit according to the invention.

Reference is made to the drawings and, more particularly to the hydraulic schematic of a circuit generally illustrated at 100 which is used to close an actuator generally illustrated at 111 which can terminate flow within a flowline such as a pipeline (not illustrated) to which the actuator is attached, if the pressure within the pipeline falls outside of a predetermined operating range.

A dump valve 112 is used in an actuator circuit generally illustrated at 113 and is used to dump the hydraulic fluid within actuator 111 to a reservoir 114, the signal to do so coming from a control circuit generally illustrated at 115.

A pressure reducing valve 116 reduces the pressure of the hydraulic fluid in the actuator circuit 113 and this fluid at a reduced pressure is used in the control circuit 115. A two line pilot valve 117 according to the invention is connected into the control circuit 115 as well as a trip control solenoid valve 118 in parallel with the pilot valve 119. A manual control valve 120 is located upstream of the trip control solenoid valve 118 and pilot valve 119. An accumulator 121 is connected to the control circuit 115.

The actuator circuit 113 further includes two pumps, namely a manual pump 122 and a power pump 123, either of which may be used by the operator depending on his location relative to the position of the actuator 111. A pressure limiting device 124 is provided to vent the excess pressure in the actuator cylinder circuit 113. The fluid vented is returned to the reservoir 114.

Figure 2:
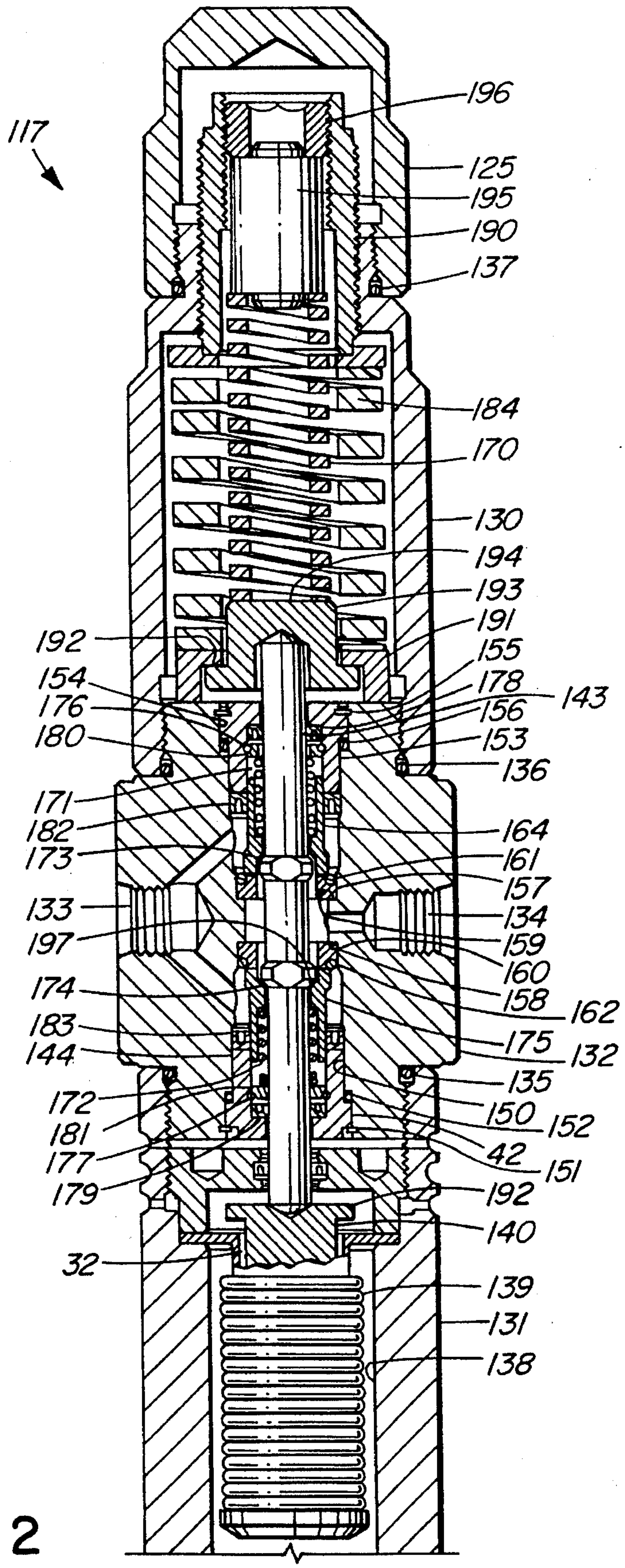
FIG. 2 is a partially sectional view of the pilot valve in a first embodiment of the invention in which both high and low pressure conditions falling outside a predetermined operating range of a flowline can initiate operation of the pilot valve.

The two line pilot valve 117 in a first embodiment is illustrated in some detail in FIG. 2. The pilot valve 117 comprises a base housing 131 which is operatively connected to a flowline (not illustrated). The base housing 131 is threadedly connected to a valve body 132 having inlet and outlet ports 133, 134, respectively. Valve body 132 is symmetrical about its center line so that all parts are the same both as used on the top and the bottom as will be described. The valve body 132 is threadedly connected to a spring housing 130. An access cap 125 is threadedly connected to the spring housing 130. 0-rings 135, 136, 137 are interposed between the base housing 131 and the valve body 132, the valve body 132 and the spring housing 130 and the access cap 125, respectively.

A cavity 138 is machined in the base housing 131 and a bellows 139 is operatively connected to a bellows core 140 which moves within the cavity 138 responsive to the change in pressure within the flowline 141. Bellows core 140 has an upper flange 142 which moves within the lower portion of valve body 132.

A pushrod 143 is axially movable in the upper portion of base housing 131, valve body 132 and the spring housing 130. A lower rod guide 144 is mounted within a bottom opening 150 in valve body 132 and is retained in position by retaining ring 151. An o-ring 152 is mounted between pushrod guide 144 and valve body 132. Likewise, an upper rod guide 153 is mounted within a top opening 154 in the valve body 132 and is retained in position by retaining ring 155. An o-ring 156 is mounted between rod guide 153 and valve body 132.

A pair of core rings 157, 158 are positioned within valve body 132 and are located in position in the valve body 132 by shoulders 159, 160, respectively. O-rings 161, 162 are interposed between the core rings 157, 158 and valve body 132, respectively.

Figure 5:
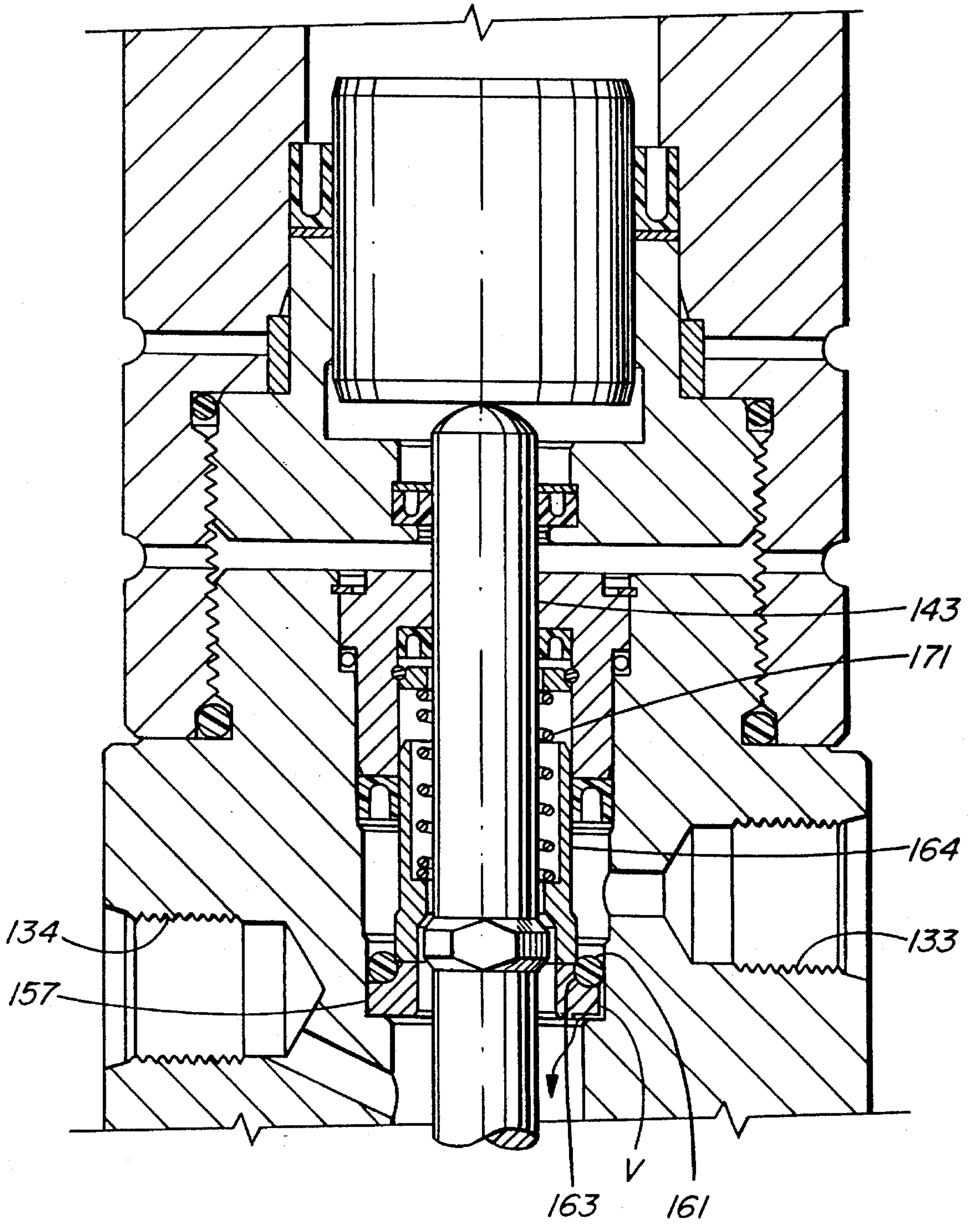
FIG. 5 is an enlarged partially sectional view particularly illustrating the operation of the o-rings and core rings of the pilot valve according to the invention.

The shape of the neck 163 of the core ring 157, as best seen in FIG. 5, corresponds to the toroidal shape of the inner surface of the o-ring 161. The diameter of the neck 163 of the core ring 157 is such that o-ring 161 is slightly compressed between the neck of the core ring 157 and the internal diameter of the valve body 132. The compression is only sufficient to ensure that the o-ring 161 will form a leak tight seal between the neck 163 of the core ring 157 and the valve body 132, but not enough to cause wrinkling of the supper surface of the o-ring 161 against which the outer corner of a poppet sleeve 164 must seal, as will be described. Additionally, the core ring 157 allows fluid trapped under the o-ring 161 to drain into the outlet chamber 134 of the pilot valve 117 thus venting the corner region noted "V" under the o-ring 161. It is also noted that the surface of the o-ring 161 on the side of poppet sleeve 164 is acted on by pressure of the fluid in the inlet chamber 133 whereas the vented side is at the pressure of outlet chamber 134. This pressure unbalance holds the o-ring 161 in position against the core ring 157 and the body 132 rather than permitting it to follow the poppet sleeve 164 when the poppet sleeve 164 is pushed away from the core ring 157 as the poppet sleeve 164 is opened by the pushrod 143.

The neck 163 of the core ring 157 supports the inside of the o-ring 163 against the force of the inlet pressure and the length of the neck 163 of the core ring 157 is such that the upper end of the neck 163 provides a consistent stopping position for the poppet sleeve 164 when it is in optimum sealing contact with the o-ring 161. The poppet sleeve 164 conveniently has a consistent stopping point when seated that is independent of the fluid pressure in the inlet chamber 133 of the pilot valve 117 and the swelling effects of the media in the valve 117 on the elastomer from which the o-ring 163 is made in order that the opening of the poppet sleeve 164 (i.e.,at a set point of the pilot valve 117) remains consistent and changes only when the compression of spring 170 is adjusted to change the set point of the pilot valve 117.

By supporting the poppet sleeve 167 on the core ring 157 and locating the sealing contact between the outer corner of the poppet sleeve 164 and a diameter on the inner half of the o-ring 161, a high and consistent unit pressure at the sealing line can be obtained with a minimal force in sleeve spring 171 of poppet sleeve 164.

A high unit pressure at the sealing line allows a leak tight seal initially and a continuation of leak tightness for variations in the elastomer hardness of o-ring 161.

Upper poppet sleeve 164 and a lower poppet sleeve 175 are slidably mounted on pushrod 143 for axial movement relative thereto under the influence of rod flanges 173, 174, respectively. The upper and lower poppet sleeves 164, 175 are used to obtain a sharp or quick opening action with a minimum amount of movement to obtain large areas of flow. Sleeve springs 171, 172 are mounted within the upper and lower poppet sleeves 164, 175, respectively, and act to bias the poppet sleeves 164, 175 toward the core rings 157, 158. Retaining rings 176, 177 are mounted within the rod guides 144, 153 and act to locate the spring supports 180, 181 in the rod guides 153, 144, respectively. Rod seals 178, 179 are positioned in rod guides 153, 144, respectively, beneath the spring supports 180, 181 so as to seal between rod guides 153, 144 and pushrod 143 from which it will be noted that rod seals 180, 181 are exposed to the outlet pressure only.

The inner end of each poppet sleeve 164, 175 is adapted to contact its respective o-ring 161, 162, when the poppet sleeves 164, 175 is not in contact with the pushrod flanges 173, 174. Upper and lower sleeve seals 182, 183 are located between the poppet sleeves 164, 175 and the valve body 132, it being noted that only the upper and lower sleeve seals 182, 183 are required to confine the pressurized fluid to the inlet chamber 133 of the pilot valve 117.

It will be further noted that the sealing action of the poppet sleeves 164, 175, takes place at the corners of their outside diameters where the poppet sleeves 164, 175 contact the o-rings 161, 162, respectively. The opposite end of the cavity confining the hydraulic fluid is defined by the seals 182, 183, respectively. The diameters of the opposite ends of the cavities are approximately the same. This allows the poppet sleeves 164, 175 to open without the necessity of overcoming a large force imbalance.

A high pressure trip point spring 184 is positioned within spring housing 130 and acts between a high adjuster screw 190 and a spring cup 191 which abuts the flange 192 of spring button 193 and which spring cup 191 is adapted to contact valve body 132 in the lowermost position of the spring cup 191. Spring button 193 maintains contact with the upper end of pushrod 143.

A low pressure trip point spring 170 is mounted between the upper end 194 of spring button 193 and a spring spacer 195. A low trip adjuster 196 is threadedly engaged internally of high adjuster screw 190 and a spring spacer 195 is operatively positioned between the low trip adjuster 196 and the low pressure spring 170. Spring button 193 will move with pushrod 143 and may move relative to spring cup 191 when the spring cup 191 is in contact with the upper end of valve body 132.

OPERATION

In operation and with initial reference to FIG. 1, it will be assumed that the actuator 111 is in the shut-down configuration; that is, the condition where fluid flow through the flowline has been terminated because of pressure conditions therein that are outside of the predetermined operating limits or trip points required by the pilot valve 117 as described in greater detail hereafter.

In this condition, fluid has exhausted through the pilot valve 119 to reservoir 114 and has thereby shutdown the flowline (not illustrated) to which the actuator 111 is operably connected. It will be further assumed that the manually operated pump 122 is to be used to provide pressure to the control and actuator circuits 115, 113, respectively. The high and low trip points of the pilot valve 117 will have been adjusted by appropriate movement of high adjuster screw 190 and low trip adjuster screw 196, respectively, which set the desired preloads in high pressure spring 184 and low pressure spring 170 and thereby set the high and low trip points of the pilot 117.

In the event the pressure conditions within the flowline are not known or in the event they are known to be outside predetermined limits, the manual control valve 120 will be closed and the manual pump 122 operated. Fluid will thereby flow through the pressure reducing valve 116 and the pressure of such fluid will act to close the dump valve 112 such that no fluid can flow through the dump valve 112. Thus, the fluid from the pump 122 will pass to actuator 111 and will open the actuator 111 and the shut-in valve (not illustrated) in the flowline to which the actuator 111. is operably connected. This will allow flow through the flowline to which the actuator 111 is operably connected.

As flow through the flowline commences and the pressure conditions are within predetermined set points, the pilot valve 117 will return to its normally closed position as seen in FIGS. 1 and 2; that is, no fluid will flow through pilot valve 117. This is so because the pushrod 143 is in its centred position and the upper and lower poppet sleeves 164, 175 are in sealing contact with o-rings 161, 162 of the core rings 157, 158. Likewise, there will be no fluid flow through the trip control solenoid valve 118 if no power is being provided to the trip control solenoid valve 118. Manual control valve 120 is then opened to allow access by the fluid in the control circuit 115 to the pilot valve 117.

It will next be assumed that the pressure within the flowline departs from the set point range of the pilot valve 117. In particular, it will be assumed that the pressure in the flowline decreases because of leakage from the line.

In this event and with reference to FIG. 2, the bellows 139 and bellows core 140 will move downwardly. The pushrod 143, being biased downwardly by low pressure spring 170, will follow the bellows core 140 downwardly. As the pushrod 143 moves downwardly, it will avoid contact with the poppet sleeves 164, 175, until the pushrod lower flange 174 contacts the shoulder 197 in lower poppet sleeve 175 and thereby moves the inner end of poppet sleeve 175 out of sealing contact with o-ring 162. Fluid from the accumulator 121 (FIG. 1) will pass from the inlet port 133 between o-ring 162 and lower poppet sleeve 175 and exit from exhaust port 134 to reservoir 114.

The reduction in pressure in the control circuit 115 will cause the dump valve 112 to immediately open thereby allowing the hydraulic fluid from actuator 111 to exit through the dump valve 112. The piston 198 of the actuator 111, being biased to the closed position under the influence of compression spring 199, will immediately move to the closed position as the fluid within the actuator 111 exits. Thus, flow through the flowline will be terminated by the closing of the shut-in valve (not shown) connected to the actuator 111.

If, rather than the pressure decreasing, the pressure within the flowline increases beyond the upper set point of pilot 117 because of a line blockage or the input of fluid exceeding the output, the bellows 139 and bellows core 140 will move upwardly. The pushrod 143 will likewise move upwardly against the force of low pressure spring 170 and, also, high pressure spring 184 if the flange 192 of spring button 194 is in contact with spring cup 191. The upper pushrod flange 173 will contact the shoulder on high pressure poppet sleeve 164 and move the inner end of poppet sleeve 164 out of sealing contact with o-ring 161. Again, hydraulic fluid will flow from the accumulator 121 and will pass from the inlet port 133 between the o-ring 161 and the poppet sleeve 164 and exit from the exhaust port 134 to reservoir 114.

It will therefore be observed that pilot valve 117 may act independently in respect of the high and low pressures being sensed from the flowline.

Dumping of the control circuit with the use of manual control valve 120 will cause the dump valve 112 to open and the actuator 111 to close the shut-in valve in the flowline which is connected to the actuator 111 in the same manner as in the low or high pressure conditions in the flowline just described.

Four further elements are also of particular interest and are included in the control circuit 115 and the actuator circuit 113 of FIG. 1. The actuator circuit 113 includes a flow control device 185. The flow control device 185 is operable so as to adjustably restrict the rate of fluid flow through dump valve 112 which will thereby change the closing time of actuator 111 when the dump valve 112 is opened.

A pressure limiting device 124 is provided. The pressure limiting device 124 is a protective device and acts to allow fluid to pass therethrough in the event the volume of fluid within the actuator circuit 113 changes.

A restricter check valve (RCV) 186 permits full fluid flow from either the manual or power pumps 123, 124, respectively, to the actuator 111 but stops reverse flow from the actuator 111 to prevent flooding of control circuit 115 in the event pilot 119 or trip control solenoid valve 118 is opened for control purposes.

A fusible fitting 187 is provided in control circuit 115. The fusible fitting 187 is intended to melt in the event of high temperatures as would be present, for example, if a fire enveloped the actuator 111 and its related circuits. If the fitting 187 melts, the effect is precisely as if the pilot valve 117 opens. The fluid from actuator 111 will exhaust through dump valve 112 which is then open, the actuator 111 will move the shut-in valve to its closed position and the fluid flow through the flowline will cease.

Figure 3:
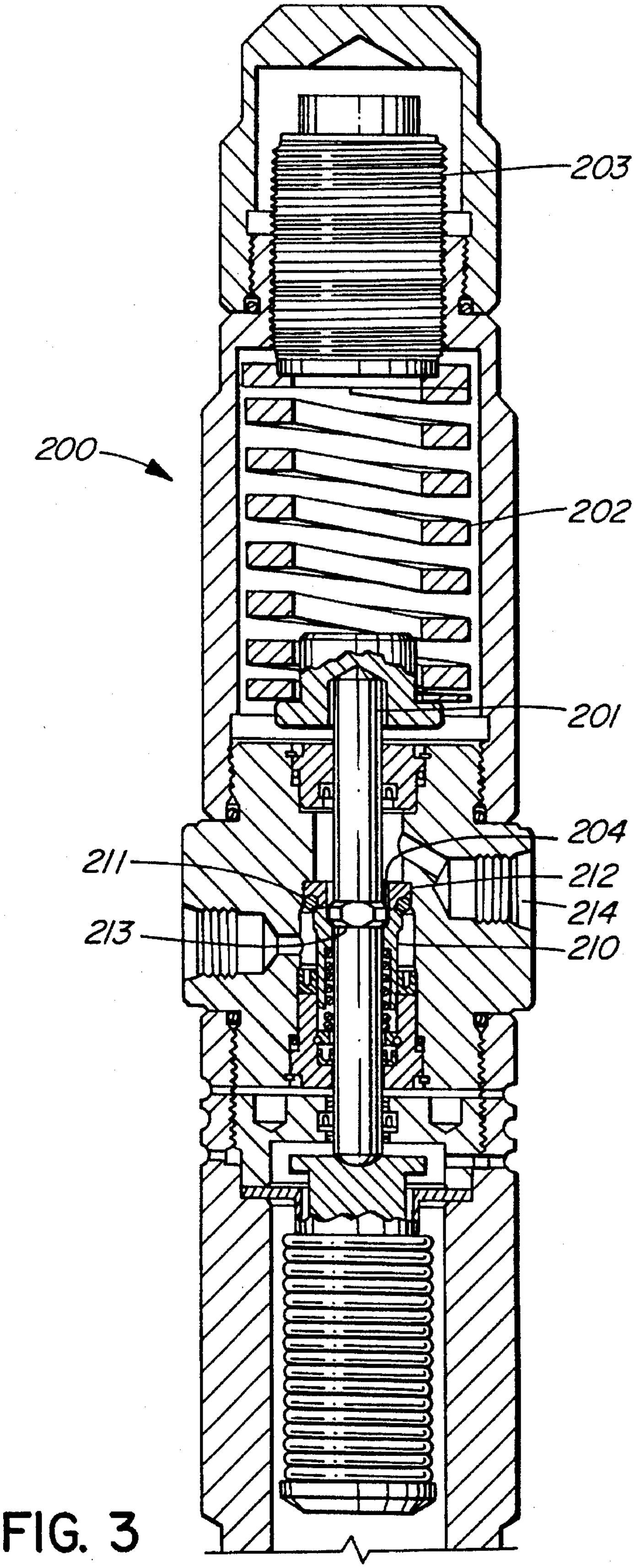
FIG. 3 is a partially sectional view of the pilot valve in a second embodiment of the invention in which a low pressure condition only will initiate operation of the pilot valve.
Figure 4:
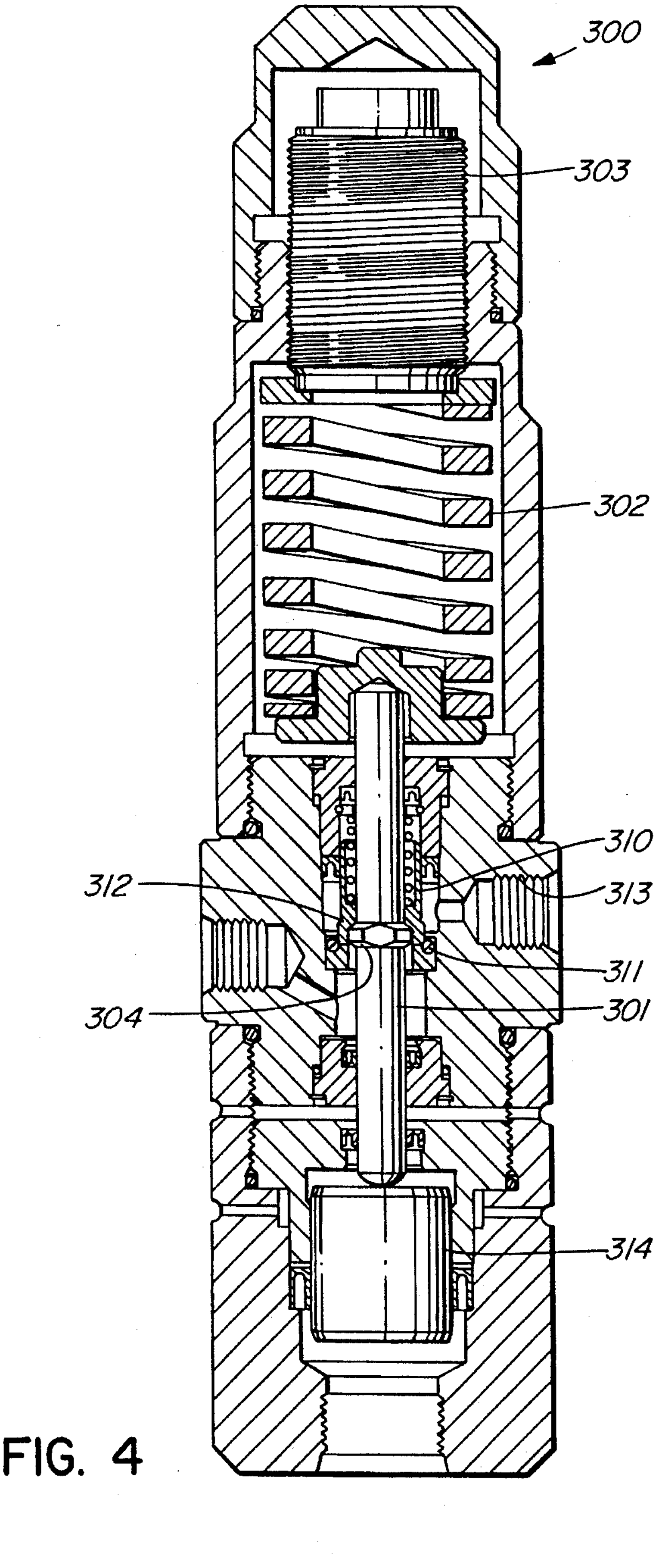
FIG. 4 is a partially sectional view of the pilot valve in a third embodiment according to the invention in which a high pressure condition only will initiate operation of the pilot valve.

Reference is now made to alternative embodiments of the pilot valve 117 as viewed in FIGS. 3 and 4.

With reference to FIG. 3, the pilot valve 200 generally illustrated at 200 is used for a low pressure trip only. In this configuration, the force on pushrod 201 is provided by a low pressure spring 202 which is adjustable by a set point adjuster 203. If a high pressure is sensed, the pushrod 201 will move upwardly but the pushrod flange 204 will not move the sleeve 201 out of contact with o-ring 211 of core ring 212 and, accordingly, fluid will not flow through the pilot valve 200 from the control circuit. The actuator 201 will therefore remain in its position thus maintaining the shut-in valve in its open position.

However, if the low set point of the pilot 200 is exceeded, the pushrod 201 will move downwardly. The pushrod flange 213 will contact the shoulder of poppet sleeve 210 thereby moving poppet sleeve 210 out of contact with o-ring 211 and allowing fluid to flow from exit port 214 thereby terminating flow through the flowline as previously explained.

With reference to FIG. 4, the pilot valve 300 is to be used for a high set point trip only. In this configuration, the force on pushrod 301 is provided by a high pressure spring 302 which is adjustable by a high set point adjuster 303. If a low pressure is sensed, the pushrod 301 will move downwardly but the pushrod flange 304 will not move the poppet sleeve 310 out of contact with o-ring 311 and, accordingly, fluid will not flow through the pilot valve 300 from the control circuit and the actuator 111 and shut-in valve will remain in their respective open positions.

However, if the high set point is exceeded, the pushrod 301 will move upwardly. The pushrod flange 304 will contact the sleeve shoulder 312 thereby moving poppet sleeve 310 out of contact with o-ring 311 and allowing fluid to flow from exit port 313 and thereby terminating flow through the flowline as described.

The embodiment of FIG. 4 also includes a plunger 314 which replaces the bellows 139 and bellows core 140 of the FIG. 2 embodiment. A plunger 314 is used, for example, when higher pressure conditions are to be sensed than can be accommodated by a bellows. For example and according to the bellows used in the present application, pressure conditions of approximately 5000–10000 p.s.i. can be sensed utilising the plunger 314 whereas with the bellows 139 and bellows core 140, pressures of about 2500 p.s.i. are the limits of the pressures which can be sensed in the flowline.

Figure 6A:
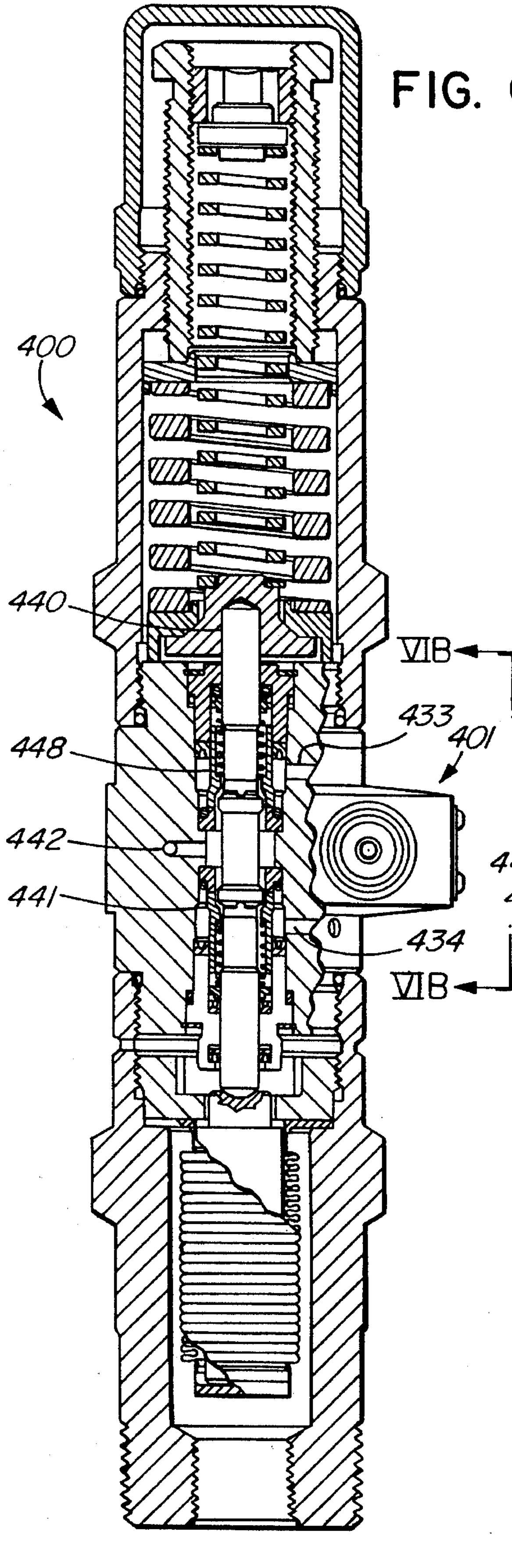
FIG. 6A is a view of a two line pilot with a high-low trip indicator connected thereto according to a further aspect of the invention.
Figure 6B:
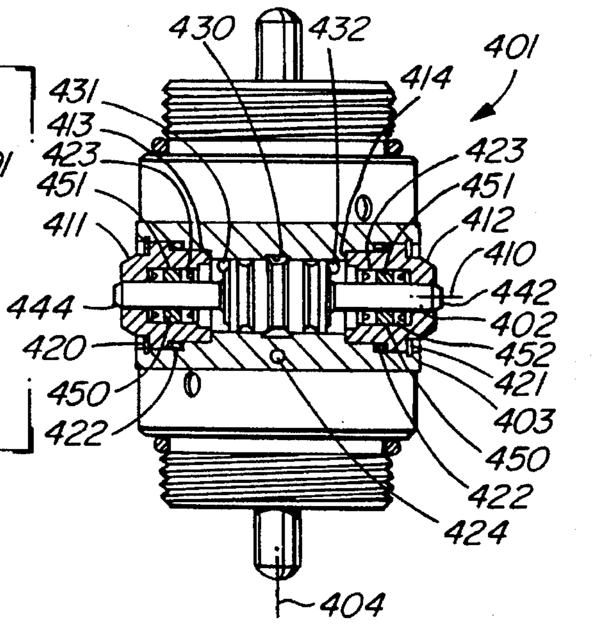
FIG. 6B is an enlarged view of the high-low trip indicator taken along VIB—VIB of FIG. 6A.

Yet a further embodiment of the invention is illustrated in FIGS. 6A and 6B. In this embodiment, the two line pilot is generally illustrated at 400 and operates similarly to the two line pilots previously described. However, a high-low trip indicator generally illustrated at 401 is connected within the hydraulic circuit and visually displays whether the pressure within the hydraulic circuit has exceeded a first predetermined pressure or has dropped below a second predetermined pressure. This may be important since although the pilot has been tripped when pressures fall outside a predetermined range for which the pilot 400 has been adjusted, there is otherwise no indication whether the pressure has exceeded a predetermined value or has fallen below a predetermined value.

The trip indicator 401 has an elongate spool 402 which is designed to move relative to the spool body 403 and which is symmetrical about a central plane 404 which is transverse to the longitudinal axis 410 of the spool 402.

First and second trip indicator guides 411, 412 are mounted in the spool body 403, abutting shoulders 413, 414 of spool body 403 and are retained in position by retaining rings 420, 421. O-rings 422 are positioned between guides 411, 412 and the spool body 403. A u-cup 423 is mounted about each side of spool 402 and spacers 450 are likewise mounted about the spool 402 and abuts a retaining ring 451. Wipers 452 are mounted on the opposite side of the retaining ring 451 about the spool 402 between the spool 402 and the spool guides 411, 412.

The spool body 403 has an inlet port 424 which is connected to the inlet port (not illustrated) of pilot 400. Inlet port 424 allows fluid to fill the cavity 430 between the spool 402 and the spool body 403.

Two outlet ports 431, 432 are located in the spool body 403 on opposite sides of the central cavity 430. The outlet ports 431, 432 are connected to the ports 433, 434, respectively, of the pilot 400.

In operation, and when a low pressure condition exists, the pushrod 440 in pilot 400 will move downwardly as previously described until the poppet sleeve 441 is displaced thereby allowing fluid to exit from port 434 to the tank or reservoir port 442. This will also allow fluid to exit from port 432 of the trip indicator 401 thereby creating a pressure imbalance and causing the spool 402 to move rightwardly. The rightward end 442 of spool 402 will protrude or extend outwardly from the side of trip indicator 401 and is readily observable by an operator.

Conversely, if a high pressure condition exists, the push rod 440 will move upwardly as described until poppet sleeve 443 is displaced upwardly thereby allowing fluid to flow from port 433 to tank port 442. Likewise, fluid will flow out port 431 in spool body 403 thereby creating a pressure imbalance and spool 402 will move leftwardly. The left end 444 of spool 402 will protrude or extend from the side of trip indicator 401 and is readily observable by the operator. The trip indicator 401 may be marked on opposite sides with the words "HI" or "LO" to coincide with the extension of the left or right ends from the spool body 403.

When the spool 402 in the trip indicator 401 has moved to either the right or left hand position, it will remain in this shifted position until manually recentered after the control circuit is repressured and the monitored pressure is within the pilot set points.

While the trip indicator 401 has been described as useful with a hydraulic circuit, it is also contemplated that it could conveniently be used for other circuits as well, such as pneumatic circuits.

Many further modifications will readily occur to those skilled in the art to which the invention relates and the specific embodiments described are intended to be illustrative of the invention only and not as limiting its scope as defined in accordance with the accompanying claims.

I claim:

1. Indicator to non-destructively and repeatedly visually indicate whether a pilot valve has responded to a pressure condition above or below a pre-determined pressure range within a circuit, said pilot valve being operable to control a main valve, said visual indication for said pressure condition above said pre-determined range being different from said visual indication for said pressure condition below said pre-determined range, said visual indication for said low pressure condition being a first end of a spool protruding from a first side of a spool body, said visual indication for said high pressure condition being a second end of said pool protruding on a second side of said spool body.

2. Indicator as in claim 1 wherein said spool body has an inlet opening to a central cavity and first and second outlet ports, said first and second outlet ports being located on opposite sides of said central cavity, said spool being movable responsive to a pressure differential between said first and second outlet ports.

3. Indicator as in claim 2 wherein said inlet port of said spool body is operably connected to the inlet port of said pilot valve and said first and second outlet ports of said spool body are operably connected to a reservoir port of said pilot valve.

4. Indicator as in claim 3 wherein said first and second outlet ports of said spool body are operably connected with respective first and second ports of said pilot valve, said first port of said pilot valve being closed when said second port of said pilot valve is connected to said reservoir port and said second port of said pilot valve being closed when said first port of said pilot valve is open to said reservoir port.

* * * * *